(12) United States Patent
Hiraoka et al.

(10) Patent No.: US 11,305,637 B2
(45) Date of Patent: Apr. 19, 2022

(54) VEHICLE COOLING SYSTEM

(71) Applicants: Subaru Corporation, Tokyo (JP);
Nidec Tosok Corporation, Zama (JP)

(72) Inventors: Naoki Hiraoka, Tokyo (JP); Tomoya Ozawa, Tokyo (JP); Takashi Asai, Tokyo (JP); Daisuke Murata, Zama (JP); Keita Kobayashi, Zama (JP); Tomohiro Yasuda, Zama (JP); Kenro Takahashi, Zama (JP)

(73) Assignees: SUBARU CORPORATION, Tokyo (JP); NIDEC TOSOK CORPORATION, Kanagawa (JP)

( * ) Notice: Subject to any disclaimer, the term of this patent is extended or adjusted under 35 U.S.C. 154(b) by 283 days.

(21) Appl. No.: 16/360,056

(22) Filed: Mar. 21, 2019

(65) Prior Publication Data

US 2019/0291569 A1    Sep. 26, 2019

(30) Foreign Application Priority Data

Mar. 26, 2018   (JP) .............................. JP2018-058249

(51) Int. Cl.
*B60K 11/02*   (2006.01)
*F28F 27/02*   (2006.01)
(Continued)

(52) U.S. Cl.
CPC ................ *B60K 11/02* (2013.01); *F01P 3/20* (2013.01); *F01P 5/10* (2013.01); *F01P 7/14* (2013.01);
(Continued)

(58) Field of Classification Search
CPC ........ F01P 7/14; F01P 7/16; F01P 3/02; F01P 2007/146
(Continued)

(56) References Cited

U.S. PATENT DOCUMENTS

2006/0005789 A1* 1/2006 Miura ....................... F01P 7/16
123/41.1
2013/0020513 A1   1/2013 Matsusaka et al.
(Continued)

FOREIGN PATENT DOCUMENTS

CN         104100758 A    10/2014
CN         104633133 A     5/2015
(Continued)

OTHER PUBLICATIONS

Official Communication issued in corresponding Chinese Patent Application No. 201910220792.6, dated Jan. 5, 2021.
(Continued)

*Primary Examiner* — Jianying C Atkisson
*Assistant Examiner* — Meraj A Shaikh
(74) *Attorney, Agent, or Firm* — Keating & Bennett, LLP

(57) ABSTRACT

A vehicle cooling system includes a circulation flow path section which has a first flow path section and a second flow path section, and a solenoid valve which can switch between an open state in which the first flow path section and the second flow path section are connected and a closed state in which the first flow path section and the second flow path section are blocked. The circulation flow path section includes a valve body accommodating section configured to include a first accommodating section and a second accommodating section which connects the first flow path section and the second flow path section in the open state, and a connection flow path section whose one end is connected to the first flow path section. The other end of the connection flow path section opens to the first accommodating section.

6 Claims, 4 Drawing Sheets

(51) Int. Cl.
   *F01P 3/20*   (2006.01)
   *F01P 5/10*   (2006.01)
   *F01P 7/14*   (2006.01)

(52) U.S. Cl.
   CPC ........ *F28F 27/02* (2013.01); *F01P 2007/146* (2013.01)

(58) Field of Classification Search
   USPC ........................................................ 236/34.5
   See application file for complete search history.

(56) References Cited

U.S. PATENT DOCUMENTS

| | | | | |
|---|---|---|---|---|
| 2014/0224891 | A1* | 8/2014 | Matsusaka | ................ F01P 7/14 236/34.5 |
| 2016/0305569 | A1 | 10/2016 | Schmid et al. | |
| 2018/0209323 | A1 | 7/2018 | Takahashi | |

FOREIGN PATENT DOCUMENTS

| | | |
|---|---|---|
| CN | 106051171 A | 10/2016 |
| CN | 206637090 U | 11/2017 |
| EP | 0 524 882 A1 | 1/1993 |
| JP | 2003-254059 A | 9/2003 |
| JP | 2011-158037 A | 8/2011 |
| JP | 2013-117297 A | 6/2013 |
| JP | 2013-525653 A | 6/2013 |
| JP | 2017-082950 A | 5/2017 |
| JP | 2018-031437 A | 3/2018 |

OTHER PUBLICATIONS

Official Communication issued in corresponding Japanese Patent Application No. 2018-058249, dated Jan. 25, 2022.

* cited by examiner

VEHICLE COOLING SYSTEM

BACKGROUND OF THE INVENTION

Field of the Invention

The present invention relates to a vehicle cooling system.
Priority is claimed on Japanese Patent Application No. 2018-058249, filed Mar. 26, 2018, the content of which is incorporated herein by reference.

Description of Related Art

A vehicle cooling system in which a water circuit through which cooling water flows is opened or closed by a solenoid valve is known. For example, Japanese Unexamined Patent Application, First Publication No. 2003-254059 discloses a configuration in which a water circuit that sends cooling water to an engine is opened or closed by a solenoid valve.

SUMMARY OF THE INVENTION

When a water circuit is closed by a solenoid valve as described above, a pressure of a fluid flowing in the water circuit is applied to a valve body of the solenoid valve. For this reason, when a flow rate in the water circuit is relatively large, a relatively large force is required to keep the valve body closed, which may increase a size of the solenoid valve in some cases.

In view of the problems described above, an object of the present invention is to provide a vehicle cooling system in which a solenoid valve is able to be reduced in size.

One aspect of a vehicle cooling system of the present invention includes an object to be cooled, which is mounted on a vehicle, a circulation flow path section which has a first flow path section and a second flow path section, and in which a refrigerant for cooling the object to be cooled circulates, a solenoid valve which has a valve body, and can switch between an open state in which the first flow path section and the second flow path section are connected and a closed state in which the first flow path section and the second flow path section are blocked by causing the valve body to move in a predetermined direction, and a pump section configured to cause the refrigerant to circulate in the circulation flow path section. The circulation flow path section includes a valve body accommodating section configured to connect the first flow path section to the second flow path section and to accommodate the valve body, and a connection flow path section whose one end is connected to the first flow path section. The valve body accommodating section includes a first accommodating section which is positioned on one side in the predetermined direction, and a second accommodating section which is positioned on the other side in the predetermined direction, and connects the first flow path section to the second flow path section in the open state while being partitioned from the first accommodating section by the valve body. The other end of the connection flow path section opens to the first accommodating section.

According to one aspect of the present invention, a vehicle cooling system capable of decreasing a solenoid valve in size is provided.

DETAILED DESCRIPTION OF THE INVENTION

Hereinafter, a vehicle cooling system according to an embodiment of the present invention will be described with reference to drawings.

The scope of the present invention is not limited to the following embodiments and can be arbitrarily changed within a scope of the technical concepts of the present invention. In addition, in the following drawings, the scales, numbers, and the like in each structure may be made different from scales, numbers, and the like in an actual structure to make respective constituents easy to understand.

In addition, a Z axis direction as appropriately shown in each drawing is a vertical direction with the upper side as a positive side and the lower side as a negative side. In the present embodiment, the vertical direction corresponds to a predetermined direction, the upper side corresponds to one side in the predetermined direction, and the lower side is the other side in the predetermined direction. Note that the vertical direction, the upper side, and the lower side are simply names for describing a relative positional relationship between respective portions, and an actual arrangement relationship and the like may be an arrangement relationship or the like other than an arrangement relationship indicated by these names and the like.

Figure 1:
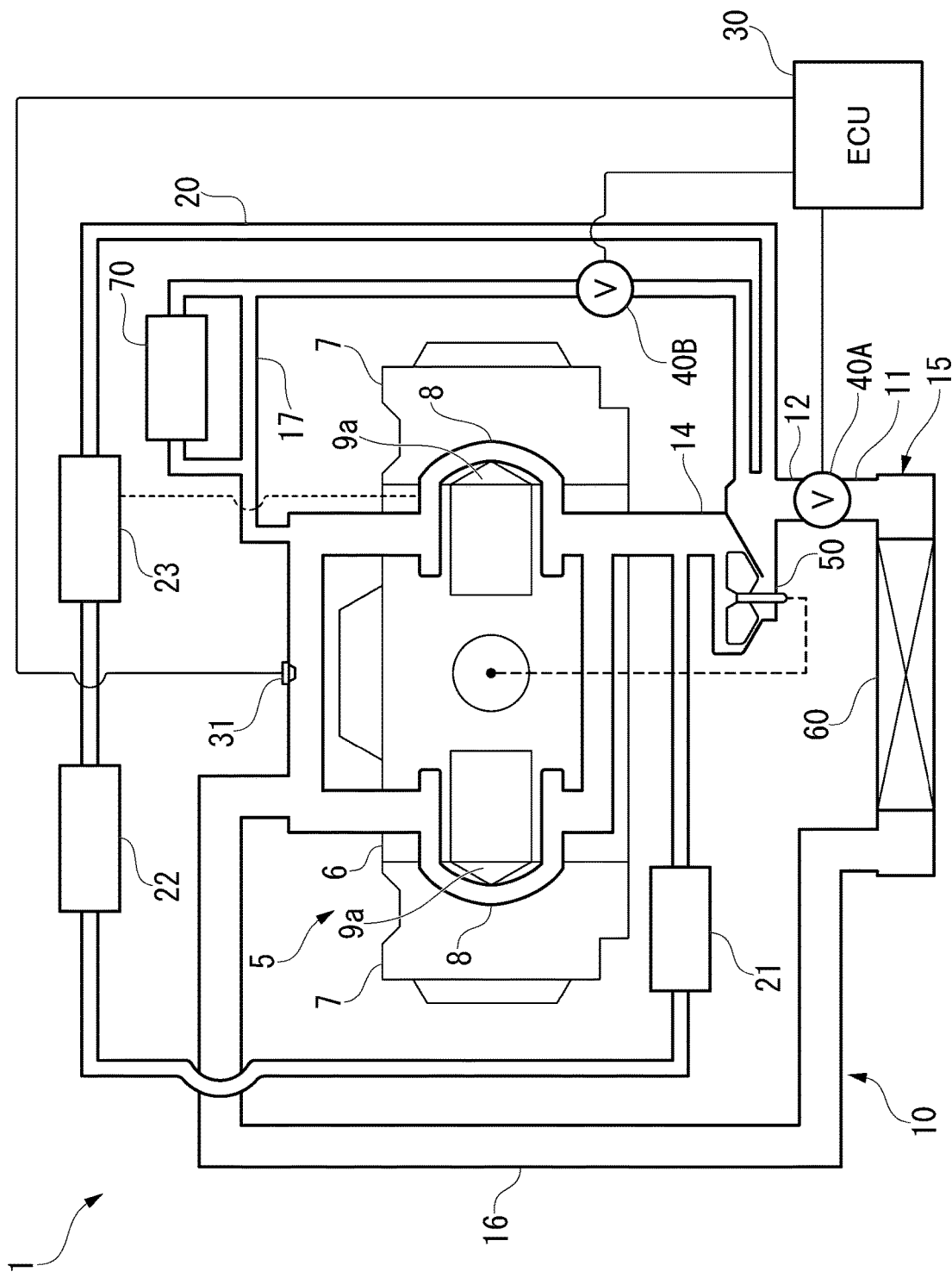
FIG. 1 is a schematic configuration diagram which schematically shows a vehicle cooling system of the present embodiment.
Figure 2:
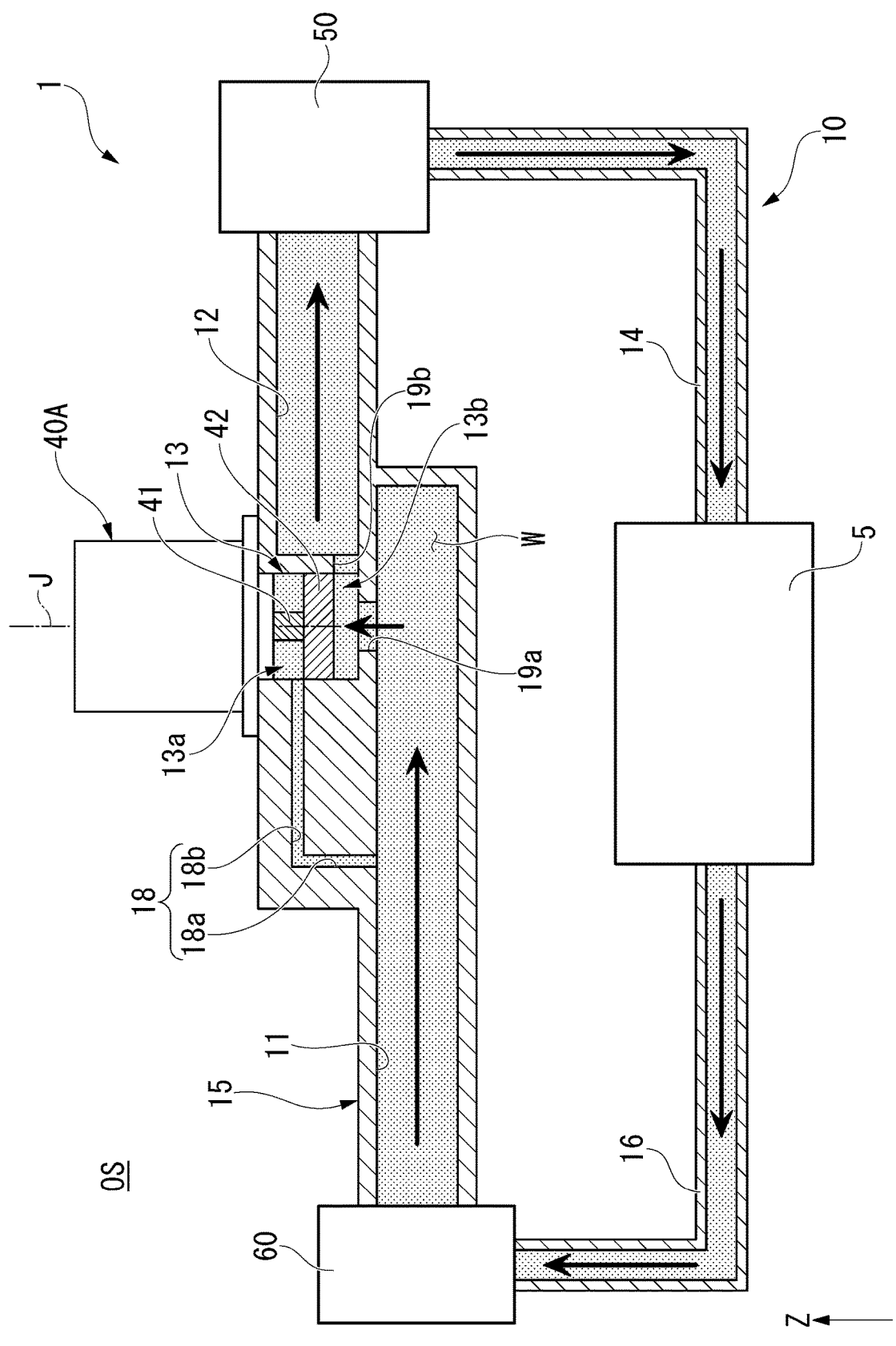
FIG. 2 is a cross-sectional view which schematically shows part of the vehicle cooling system of the present embodiment.
Figure 3:
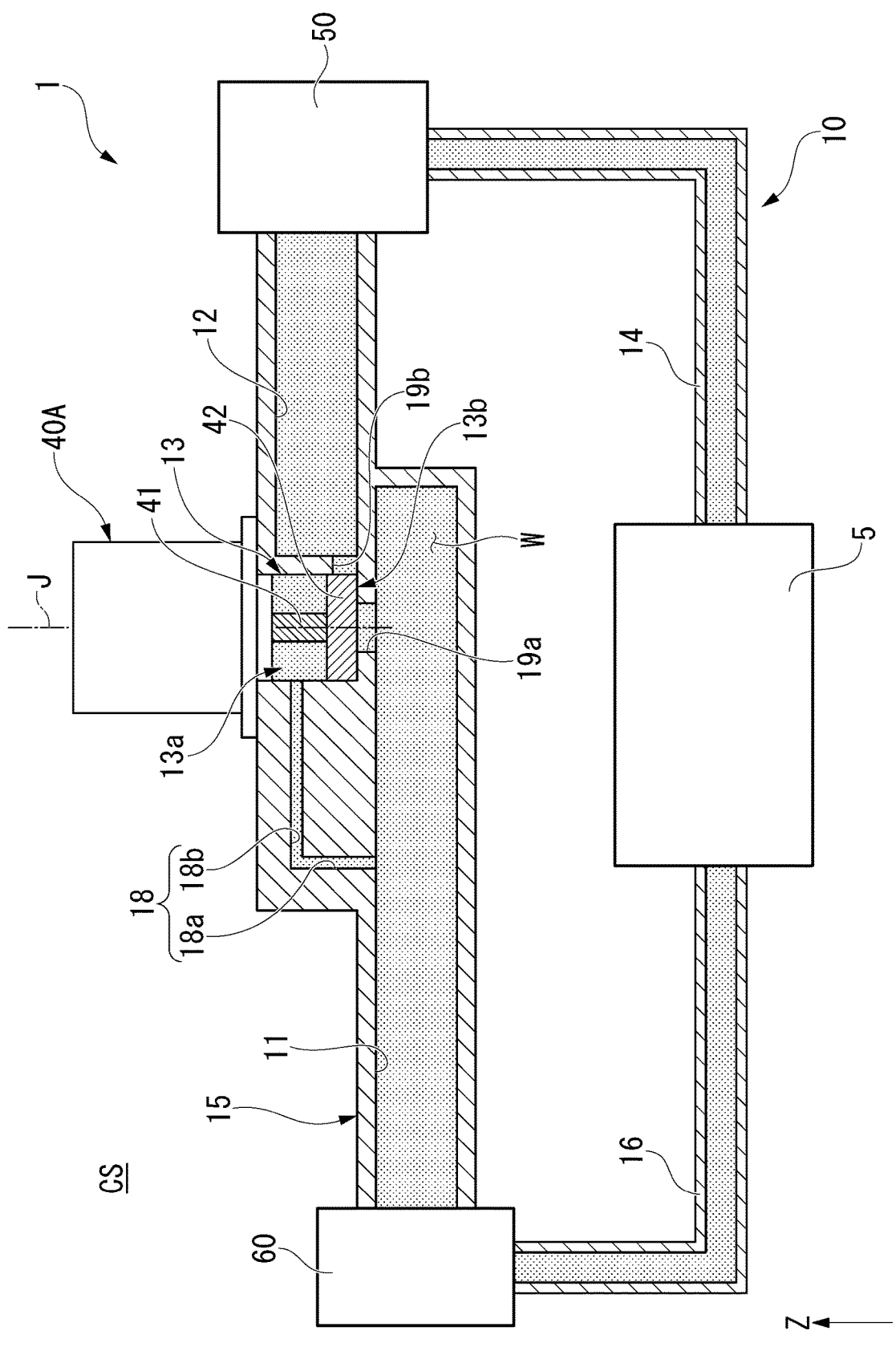
FIG. 3 is a cross-sectional view which schematically shows part of the vehicle cooling system of the present embodiment.
Figure 4:
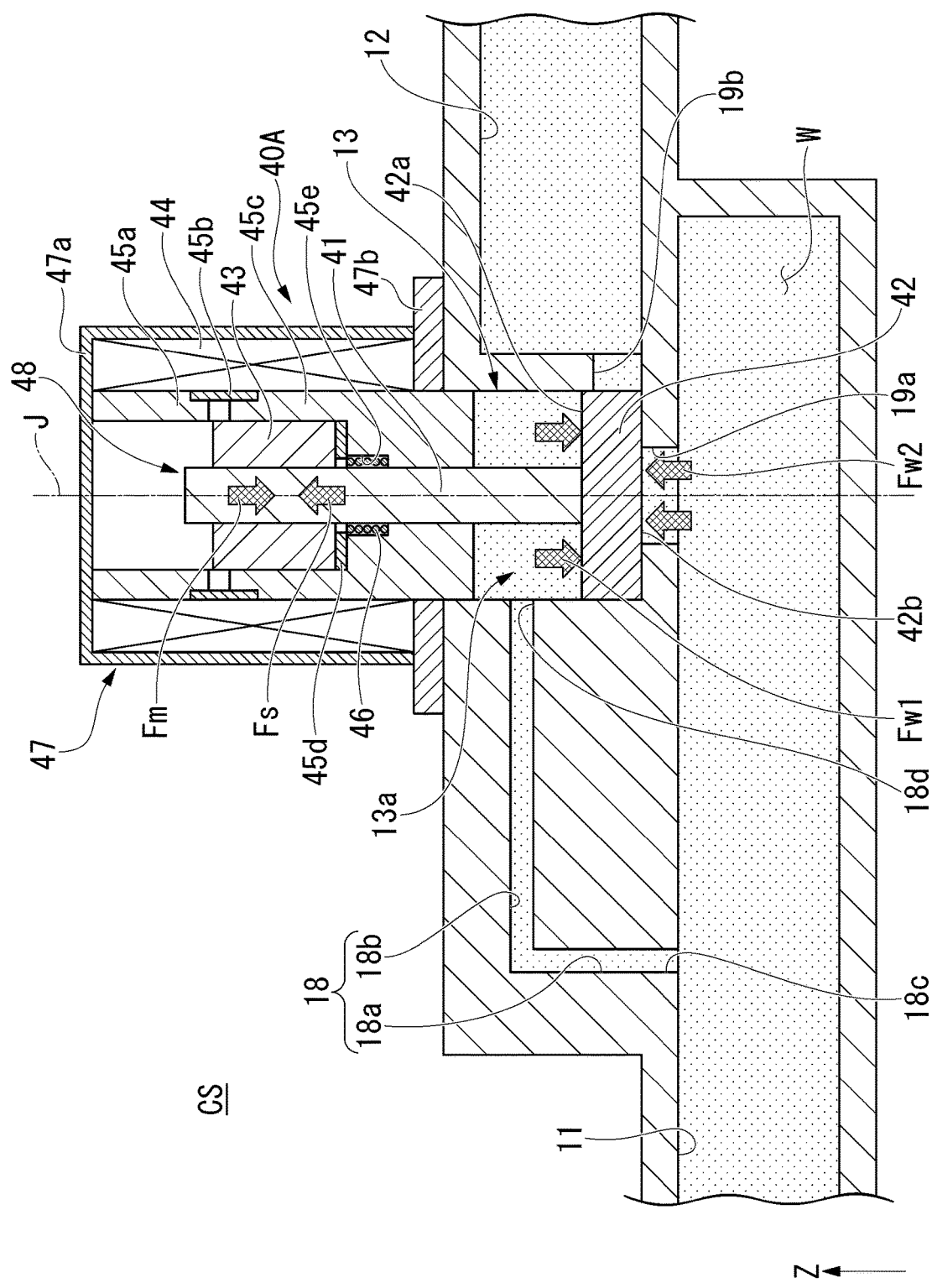
FIG. 4 is a cross-sectional view which schematically shows part of the vehicle cooling system of the present embodiment, and is an enlarged view of part of FIG. 3.

FIG. 1 is a schematic configuration diagram which schematically shows a vehicle cooling system 1 of the present embodiment. FIGS. 2 and 3 are cross-sectional views which schematically show part of the vehicle cooling system 1 of the present embodiment. FIG. 4 is a cross-sectional view which schematically shows part of the vehicle cooling system 1 of the present embodiment, and is an enlarged view of part of FIG. 3.

The vehicle cooling system 1 of the present embodiment shown in FIG. 1 is a cooling system which cools an engine 5 mounted on a vehicle using a refrigerant W. That is, the engine 5 in the present embodiment corresponds to an object to be cooled. The refrigerant W in the present embodiment is, for example, cooling water. As shown in FIG. 1, the vehicle cooling system 1 includes the engine 5, a pump section 50, a radiator 60, a circulation flow path section 10, solenoid valves 40A and 40B, a temperature sensor 31, and an engine control unit 30.

The engine 5 is a driving unit for driving a vehicle. The engine 5 in the present embodiment is a water-cooling type engine, and is a horizontally opposed gasoline engine. The engine 5 has a cylinder block 6 and a cylinder head 7 of left and right banks. A water jacket 8 is provided in the engine 5. In the present embodiment, the refrigerant W flows in a flow path section in the water jacket 8, thereby cooling a combustion chamber 9a and the like of the engine 5.

The pump section 50 causes the refrigerant W to circulate in the circulation flow path section 10. The pump section 50 in the present embodiment is an engine-driven type pump. That is, the pump section 50 is driven by the engine 5 being driven.

The radiator 60 cools the refrigerant W flowing in the circulation flow path section 10. The radiator 60 in the present embodiment corresponds to a cooling section.

The refrigerant W which cools the engine 5 circulates in the circulation flow path section 10. The circulation flow path section 10 in the present embodiment includes a flow path section in the water jacket 8, an inflow flow path section 14, an outflow flow path section 16, an introduction flow path section 15, a bypass flow path section 17, and a sub-flow path section 20.

The inflow flow path section 14 connects the pump section 50 and a flow path section in the water jacket 8. The outflow flow path section 16 connects the flow path section in the water jacket 8 and the radiator 60. The introduction flow path section 15 connects the radiator 60 and the pump section 50. The pump section 50 inhales the refrigerant W cooled by the radiator 60 from the introduction flow path section 15, and sends it to the inflow flow path section 14. The refrigerant W flowing into the inflow flow path section 14 cools the engine 5 through the flow path section in the water jacket 8. The refrigerant W flowing into the flow path section in the water jacket 8 is discharged from the outflow flow path section 16, and is cooled by the radiator 60. The refrigerant W cooled by the radiator 60 flows into the flow path section in the water jacket 8 again via the introduction flow path section 15, the pump section 50, and the inflow flow path section 14 in order, and cools the engine 5. In this manner, the refrigerant W circulates in the circulation flow path section 10, and thereby the engine 5 can be cooled.

The introduction flow path section 15 is opened and closed by the solenoid valve 40A. As a result, an open state OS in which a flow of the refrigerant W in the introduction flow path section 15 is allowed and a closed state CS in which the flow of the refrigerant W in the introduction flow path section 15 is blocked are switched. In the open state OS, as described above, the refrigerant W circulates in the circulation flow path section 10, and the engine 5 is cooled. On the other hand, in the closed state CS, in circulation of the refrigerant W in the circulation flow path section 10, the circulation through the engine 5, that is, the circulation through the flow path section in the water jacket 8, stops and cooling of the engine 5 is stopped.

As shown in FIGS. 2 and 3, the introduction flow path section 15 includes a first flow path section 11, a second flow path section 12, and a valve body accommodating section 13. That is, the circulation flow path section 10 includes the first flow path section 11, the second flow path section 12, and the valve body accommodating section 13. The first flow path section 11 extends from the radiator 60 to the valve body accommodating section 13. The second flow path section 12 extends from the valve body accommodating section 13 to the pump section 50.

The valve body accommodating section 13 connects the first flow path section 11 to the second flow path section 12. The valve body accommodating section 13 is positioned on an upper side of the first flow path section 11. The valve body accommodating section 13 opens upward. An inner circumferential surface of the valve body accommodating section 13 in the present embodiment has a cylindrical shape extending in a vertical direction.

Note that a radial direction centering on a center axis J of the valve body accommodating section 13 will be simply referred to as a "radial direction," and a circumferential direction centering on the center axis J of the valve body accommodating section 13 will be simply referred to as a "circumferential direction" in the following description.

The solenoid valve 40A is attached to the valve body accommodating section 13. The opening on the upper side of the valve body accommodating section 13 is closed by the solenoid valve 40A. The valve body accommodating section 13 accommodates a valve body 42 of the solenoid valve 40A. The valve body accommodating section 13 is partitioned into a first accommodating section 13a and a second accommodating section 13b positioned on a lower side of the first accommodating section 13a in the vertical direction by the valve body 42. As a result, the valve body accommodating section 13 has the first accommodating section 13a positioned on the upper side and the second accommodating section 13b which is positioned on the lower side and partitioned from the first accommodating section 13a by the valve body 42.

The valve body accommodating section 13 has hole sections 19a and 19b. That is, the circulation flow path section 10 has the hole sections 19a and 19b. The hole section 19a is provided in a bottom wall portion on a lower side among wall portions constituting the valve body accommodating section 13. The hole section 19b is provided in a circumferential wall portion in the radial direction among the wall portions constituting the valve body accommodating section 13. As shown in FIG. 2, the hole section 19a connects the first flow path section 11 to the second accommodating section 13b in the open state OS. The hole section 19b connects the second accommodating section 13b to the second flow path section 12 in the open state OS. As a result, the second accommodating section 13b connects the first flow path section 11 to the second flow path section 12 via the hole sections 19a and 19b in the open state OS.

As shown in FIG. 1, the bypass flow path section 17 extends from a refrigerant outlet side of the water jacket 8 to the second flow path section 12. A heat core 70 for an air-conditioner is connected in parallel to the bypass flow path section 17. The solenoid valve 40B that opens and closes the bypass flow path section 17 is provided in the bypass flow path section 17.

The sub-flow path section 20 extends from the inflow flow path section 14 to the second flow path section 12. The refrigerant W constantly circulates in the sub-flow path section 20 while the pump section 50 is driven. For example, a turbocharger 21, an EGR cooler 22, and an oil cooler 23 are provided in the sub-flow path section 20 as auxiliary equipment that requires cooling.

As shown in FIG. 4, the circulation flow path section 10 further includes a connection flow path section 18. The connection flow path section 18 has one end connected to the first flow path section 11, and the other end opening to the first accommodating section 13a. The connection flow path section 18 in the present embodiment has a first portion 18a and a second portion 18b.

The first portion 18a extends upward from a wall surface on the upper side of the first flow path section 11. An end portion on the lower side of the first portion 18a is a first opening portion 18c opening to the first flow path section 11.

The second portion 18b extends from an end portion on the upper side of the first portion 18a to the valve body accommodating section 13 in a direction orthogonal to the vertical direction. An end portion of the second portion 18b on a side of the valve body accommodating section 13 is a second opening portion 18d which opens to the inner circumferential surface of the valve body accommodating section 13, and opens in the first accommodating section 13a. The second opening portion 18d is disposed on a side opposite to the hole section 19b across the center axis J of the valve body accommodating section 13 in the radial direction. The second opening portion 18d is positioned on a side above the hole section 19b.

The solenoid valve 40A can switch between an open state OS in which the first flow path section 11 and the second flow path section 12 are connected and a closed state CS in which the first flow path section 11 and the second flow path section 12 are blocked. The solenoid valve 40A has a cover 47, a solenoid 44, a first magnetic member 45a, a second magnetic member 45c, a first spacer 45b, a second spacer 45d, and a movable portion 48.

The cover 47 accommodates the solenoid 44. The cover 47 has a first cover 47a and a second cover 47b. The first cover 47a has a cylindrical shape with a lid that opens downward. The second cover 47b has a plate shape in which a plate surface faces in the vertical direction, and is an annular shape along the circumferential direction. The second cover 47b is fixed to an end portion of the lower side of the first cover 47a. The second cover 47b covers the lower side of the solenoid 44.

The solenoid 44 has a cylindrical shape centering on the center axis J and extending in the vertical direction. The solenoid 44 is fixed to an inner circumferential surface of the cover 47. The first magnetic member 45a has a cylindrical shape centering on the center axis J and extending in the vertical direction. The first magnetic member 45a is accommodated in the cover 47 inside the solenoid 44 in the radial direction. The second magnetic member 45c has a cylindrical shape with a bottom centering on the center axis J and extending in the vertical direction. The second magnetic member 45c is accommodated in the cover 47 inside the solenoid 44 in the radial direction and on the lower side of the first magnetic member 45a. The first magnetic member 45a and the second magnetic member 45c are magnetic materials.

The first spacer 45b has a cylindrical shape centering on the center axis J and extending in the vertical direction. The first spacer 45b is positioned between the first magnetic member 45a and the second magnetic member 45c in the vertical direction. Both end portions of the first spacer 45b in the vertical direction are in contact with respective magnetic members to connect the two magnetic members. The second spacer 45d has an annular plate shape centering on the center axis J. The second spacer 45d is disposed at a bottom of the second magnetic member 45c. The first spacer 45b and the second spacer 45d are non-magnetic materials. The first spacer 45b and the second spacer 45d are made of, for example, a resin.

The movable portion 48 can move along the center axis J extending in the vertical direction. The movable portion 48 has a shaft portion 41, a valve body 42, and a core portion 43. That is, the solenoid valve 40A has the shaft portion 41, the valve body 42, and the core portion 43. The shaft portion 41 has a cylinder shape extending along the center axis J. A portion on an upper side of the shaft portion 41 penetrates the bottom of the second magnetic member 45c in the vertical direction, and is inserted into the inside thereof in the radial direction. A portion on a lower side of the shaft portion 41 protrudes from the cover 47 downward, and is inserted into the valve body accommodating section 13.

The valve body 42 is fixed to an end portion of the lower side of the shaft portion 41. The valve body 42 in the present embodiment has a cylindrical shape which centers on the center axis J and is flat in the vertical direction. An outer diameter of the valve body 42 is substantially the same as an inner diameter of the valve body accommodating section 13. The valve body 42 is positioned inside the valve body accommodating section 13. The valve body 42 is fitted into the inside of the valve body accommodating section 13. An outer circumferential surface of the valve body 42 is in contact with an inner circumferential surface of the valve body accommodating section 13. When the movable portion 48 moves in the vertical direction, the valve body 42 moves in the vertical direction while the outer circumferential surface of the valve body 42 slides with respect to the inner circumferential surface of the valve body accommodating section 13.

The valve body 42 has a first pressure receiving surface 42a directed upward and facing the inside of the first accommodating section 13a and a second pressure receiving surface 42b directed downward and facing the inside of the first flow path section 11 in the closed state CS. The first pressure receiving surface 42a is an upper side surface of the valve body 42. The first pressure receiving surface 42a in the present embodiment is, for example, a flat surface orthogonal to the vertical direction. The second pressure receiving surface 42b is part of a lower side surface of the valve body 42. The second pressure receiving surface 42b in the present embodiment is, for example, a flat surface orthogonal to the vertical direction. The second pressure receiving surface 42b faces the inside of the first flow path section 11 via an inside of the hole section 19a. An area of the first pressure receiving surface 42a in the present embodiment is larger than an area of the second pressure receiving surface 42b.

The valve body 42 blocks the hole section 19a from above in the closed state CS. The second pressure receiving surface 42b receives pressure directed upward from the refrigerant W in the first flow path section 11 in the closed state CS. The valve body 42 blocks the hole section 19b in the closed state CS. In the present embodiment, the hole section 19b is blocked by the outer circumferential surface of the valve body 42.

The core portion 43 in the present embodiment has a cylindrical shape centering on the center axis J and extending in the vertical direction. The core portion 43 is fitted into the outer circumferential surface in the portion on the upper side of the shaft portion 41 and is fixed thereto. The core portion 43 is fitted into the inside of the first magnetic member 45a in the radial direction and the inside of the second magnetic member 45c in the radial direction, and is supported movably in the vertical direction by the first magnetic member 45a and the second magnetic member 45c.

The elastic member 46 is disposed in a concave portion 45e provided at the bottom of the second magnetic member 45c. The elastic member 46 in the present embodiment is a coil spring extending in the vertical direction. An end portion of an upper side of the elastic member 46 is in contact with a surface on a lower side of the core portion 43. An end portion on a lower side of the elastic member 46 is in contact with a bottom of the concave portion 45e. The elastic member 46 applies an elastic force Fs directed upward to the movable portion 48 via the core portion 43.

If a current is supplied to the solenoid 44 in the open state OS, a magnetic field is generated from the upper side to the lower side inside the solenoid 44 in the radial direction, and an electromagnetic field Fm directed downward is generated in the movable portion 48. As a result, the movable portion 48 moves to the lower side, and the hole sections 19a and 19b are blocked by the valve body 42. In this manner, the open state OS is switched to the closed state CS by the solenoid valve 40A.

On the other hand, if the current supply to the solenoid 44 stops in the closed state CS, the magnetic field due to the solenoid 44 disappears, and the electromagnetic force Fm generated in the movable portion 48 also disappears. As a result, the movable portion 48 moves upward by a fluid force Fw2 directed upward and received from the refrigerant W in the first flow path section 11 by the valve body 42, and an elastic force Fs directed upward and received from the elastic member 46 by the core portion 43. Accordingly, the hole sections 19a and 19b are opened, and the closed state CS is switched to the open state OS.

As described above, the solenoid valve 40A can switch between supply and stopping of a current to the solenoid 44 and cause the valve body 42 to move in the vertical direction, thereby switching between the open state OS and the closed state CS.

The solenoid valve 40B in the present embodiment has, for example, the same configuration as that of the solenoid valve 40A except that the flow path section to be opened and closed is different.

The temperature sensor 31 detects a temperature of the refrigerant W. As shown in FIG. 1, the temperature sensor 31 in the present embodiment is provided at a refrigerant outlet of the water jacket 8. As a result, the temperature sensor 31 can detect the temperature of the refrigerant W in the water jacket 8.

The engine control unit 30 controls the solenoid valves 40A and 40B and the temperature sensor 31. The engine control unit 30 controls opening and closing of the solenoid valves 40A and 40B, and controls a flow of the refrigerant W in the circulation flow path section 10. The engine control unit 30 may also control the solenoid valves 40A and 40B on the basis of a result of the detection by the temperature sensor 31.

According to the present embodiment, the connection flow path section 18 which connects the first flow path section 11 and the first accommodating section 13a in the valve body accommodating section 13 is provided in the circulation flow path section 10. For this reason, as shown in FIG. 4, the refrigerant W flows into the first accommodating section 13a from the first flow path section 11 via the connection flow path section 18 in the closed state CS. As a result, a fluid force Fw1 directed downward is applied to the first pressure receiving surface 42a of the valve body 42 by a pressure of the refrigerant W in the first accommodating section 13a. Therefore, at least part of the fluid force Fw2 applied to the second pressure receiving surface 42b of the valve body 42 by pressure of the refrigerant W in the first flow path section 11 can be offset by the fluid force Fw1. For this reason, the hole section 19a can be closed by the valve body 42, and an output of the solenoid valve 40A required to maintain the closed state CS can be reduced. Accordingly, it is possible to decrease the solenoid valve 40A in size. Therefore, according to the present embodiment, the vehicle cooling system 1 capable of decreasing the solenoid valve 40A in size can be obtained. In addition, since the solenoid valve 40A can be decreased in size, the entire vehicle cooling system 1 can also be easily reduced in size.

Note that the output of the solenoid valve 40A in the present embodiment is the electromagnetic force Fm. The closed state in the present embodiment is maintained by a sum of the electromagnetic force Fm and the fluid force Fw1 being larger than a sum of the fluid force Fw2 and the elastic force Fs from the elastic member 46.

In addition, as an opening area of the hole section 19a becomes larger, it is possible to reduce a loss of the refrigerant W flowing from the first flow path section 11 to the second flow path section 12 in the open state OS. However, on the other hand, as the opening area of the hole section 19a becomes larger, the fluid force Fw2 applied to the second pressure receiving surface 42b of the valve body 42 is increased. For this reason, in the conventional art, if the opening area of the hole section 19a is increased to suppress the loss of the refrigerant W, the output of the solenoid valve needs to be increased, and thus the solenoid valve may be increased in size in some cases.

On the other hand, according to the present embodiment, as described above, the output of the solenoid valve 40A required to maintain the closed state CS can be reduced. For this reason, the closed state CS can be maintained against the fluid force Fw2 larger than that in the conventional art without changing the output of the solenoid valve 40A. As a result, the opening area of the hole section 19a can be made larger than that in the conventional art without increasing the solenoid valve 40A in size, and the loss of the refrigerant W flowing in the circulation flow path section 10 can be reduced.

In addition, according to the present embodiment, the first pressure receiving surface 42a is a flat surface. For this reason, the fluid force Fw1 directed downward is easily received in a stable manner from the refrigerant W in the first accommodating section 13a. This can make it easier to reduce the output of the solenoid valve 40A required to maintain the closed state CS, and can decrease the solenoid valve 40A in size.

In addition, according to the present embodiment, an area of the first pressure receiving surface 42a is larger than an area of the second pressure receiving surface 42b. Then, since the first accommodating section 13a and the first flow path section 11 are connected to each other, a pressure of the refrigerant W in the first accommodating section 13a is substantially the same as a pressure of the refrigerant W in the first flow path section 11. As a result, a magnitude of the fluid force Fw1 applied to the first pressure receiving surface 42a can be made larger than a magnitude of the fluid force Fw2 applied to the second pressure receiving surface 42b. Therefore, the fluid force Fw2 directed upward, which is applied to the second pressure receiving surface 42b, can be offset by the fluid force Fw1, and a force directed downward, which presses the valve body 42 against the hole section 19a, can be increased. For this reason, the output of the solenoid valve 40A required to maintain the closed state CS can further be reduced. This can decrease the solenoid valve 40A in size.

In addition, according to the present embodiment, the valve body 42 has a cylindrical shape having an outer circumferential surface movable in the vertical direction while sliding with respect to the inner circumferential surface of the valve body accommodating section 13. For this reason, it is easy to partition the inside of the valve body accommodating section 13 into the first accommodating section 13a and the second accommodating section 13b by the valve body 42. In addition, since the valve body 42 is guided in the vertical direction by the inner circumferential surface of the valve body accommodating section 13, it is possible to cause the valve body 42 to stably move in the vertical direction.

Moreover, according to the present embodiment, the valve body 42 blocks the hole section 19b which connects the second accommodating section 13b and the second flow path section 12 in the open state OS in the closed state CS. For this reason, it is possible to preferably block the first accommodating section 13a and the second flow path section 12, and to maintain the closed state more stably.

Further, according to the present embodiment, the radiator 60 serving as a cooling section that cools the refrigerant W is provided. For this reason, it is possible to cool the refrigerant W whose temperature has risen due to a heat radiation from the engine 5 using the radiator 60. Therefore, the engine 5 can be cooled more preferably.

In addition, according to the present embodiment, the engine 5 as an object to be cooled is a driving unit for driving a vehicle. Here, a cooling system that cools the engine 5 of a vehicle becomes easily larger than a cooling system that cools portions other than a vehicle. For this reason, an effect that the vehicle cooling system 1 can be decreased in size by the solenoid valve 40A being decreased in size as described above can be particularly usefully obtained.

Note that the present invention is not limited to the embodiment described above, and the following other configurations may be adopted. A shape of the valve body portion is not particularly limited as long as the inside of the valve body accommodating section is partitioned into the first accommodating section and the second accommodating section. The first pressure receiving surface and the second pressure receiving surface may not be flat surfaces, and may be curved surfaces. The area of the first pressure receiving surface and the area of the second pressure receiving surface may be the same as each other.

The connection flow path section is not particularly limited as long as it is provided in the circulation flow path section and connects the first flow path section to the first accommodating section. The connection flow path section may be provided in plural. The number of connection flow path sections is not particularly limited. A configuration of the solenoid valve is not particularly limited as long as the valve body switches between the open state OS and the closed state CS. An object to be cooled is not particularly limited as long as it is mounted on a vehicle, and may also be a portion other than a driving unit of a vehicle.

Respective constituents described above can be appropriately combined within a range without contradiction each other.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 Vehicle cooling system
5 Engine (object to be cooled)
10 Circulation flow path section
11 First flow path section
12 Second flow path section
13 Valve body accommodating section
13a First accommodating section
13b Second accommodating section
18 Connection flow path section
19b Hole section
40A Solenoid valve
42 Valve body
42a First pressure receiving surface
42b Second pressure receiving surface
50 Pump section
60 Radiator (cooling section)
CS Closed state
OS Open state
W Refrigerant

What is claimed is:
1. A vehicle cooling system comprising:
an object to be cooled, which is mounted on a vehicle;
a circulation flow path section which includes a first flow path section and a second flow path section, and in which a refrigerant for cooling the object to be cooled circulates;
a solenoid valve which includes a valve body, and can switch between an open state in which the first flow path section and the second flow path section are connected and a closed state in which the first flow path section and the second flow path section are blocked by causing the valve body to move in a predetermined direction; and
a pump section configured to cause the refrigerant to circulate in the circulation flow path section, wherein the circulation flow path section includes:
  a valve body accommodating section configured to connect the first flow path section to the second flow path section and to accommodate the valve body, and
  a connection flow path section whose one end is connected to the first flow path section,
the valve body accommodating section includes:
  a first accommodating section which is positioned on one side in the predetermined direction, and
  a second accommodating section which is positioned on another side in the predetermined direction, and connects the first flow path section and the second flow path section in the open state,
the valve body accommodating section is partitioned into the first accommodating section and the second accommodating section by the valve body being fitted into an inside of the valve body accommodating section and by an outer circumferential surface of the valve body contacting with an inner circumferential surface of the valve body accommodating section;
the another end of the connection flow path section opens to the first accommodating section;
the inner circumferential surface of the valve body accommodating section has a cylindrical shape centering on a center axis and extending in the predetermined direction;
the valve body has a cylindrical shape with the outer circumferential surface movable in the predetermined direction while sliding with respect to the inner circumferential surface of the valve body accommodating section;
the valve body accommodating section includes a first hole section and a second hole section;
the first hole section is provided in a bottom wall portion on the another side in the predetermined direction among wall portions defining the valve body accommodating section;
the second hole section is provided in a circumferential wall portion in a radial direction centering on the center axis among the wall portions defining the valve body accommodating section, and connects the second accommodating section and the second flow path section in the open state;
the valve body includes a first pressure receiving surface directed to the one side in the predetermined direction and opposing an inside of the first accommodating section, and a second pressure receiving surface directed to the another side in the predetermined direction and opposing an inside of the first flow path section via an inside of the first hole section in the closed state;

the first pressure receiving surface is a surface of the valve body on the one side in the predetermined direction;

the second pressure receiving surface is a portion of surface of the valve body on the another side in the predetermined direction;

the valve body blocks the first hole section from the one side in the predetermined direction in the closed state; and the valve body blocks seconds hole section with the outer circumferential surface of the valve body in the closed state.

2. The vehicle cooling system according to claim 1, wherein the first pressure receiving surface is a flat surface.

3. The vehicle cooling system according to claim 1, wherein an area of the first pressure receiving surface is larger than an area of the second pressure receiving surface.

4. The vehicle cooling system according to claim 2, wherein an area of the first pressure receiving surface is larger than an area of the second pressure receiving surface.

5. The vehicle cooling system according to claim 1, further comprising:

a cooling section configured to cool the refrigerant.

6. The vehicle cooling system according to claim 1, wherein the object to be cooled is a driving unit for driving the vehicle.

\* \* \* \* \*